July 29, 1969
R. L. CORMIA
3,458,342
METHOD FOR APPLYING A MAR-RESISTANT FILM TO A PLASTIC
SURFACE AND THE PRODUCT PRODUCED THEREBY
Filed March 1, 1966
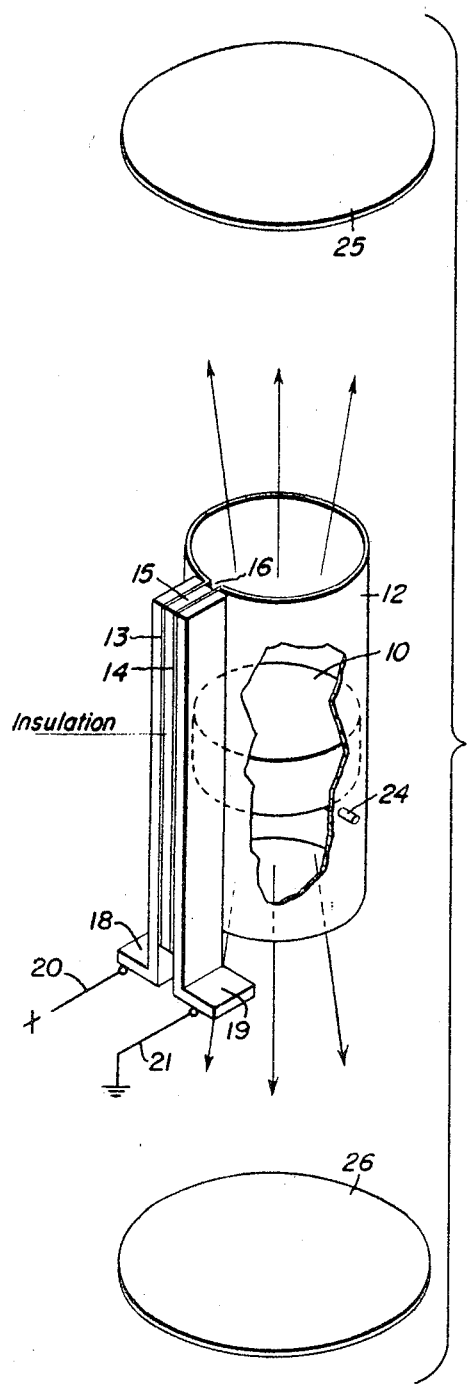
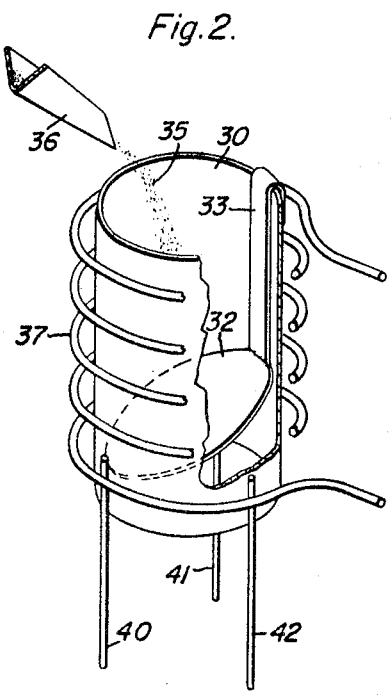
Fig. 2.
Fig. 1.
Inventor:
Robert L. Cormia,
by
His Attorney

United States Patent Office 3,458,342
Patented July 29, 1969

3,458,342
METHOD FOR APPLYING A MAR-RESISTANT FILM TO A PLASTIC SURFACE AND THE PRODUCT PRODUCED THEREBY
Robert L. Cormia, Schenectady, N.Y., assignor to General Electric Company, a corporation of New York
Filed Mar. 1, 1966, Ser. No. 530,876
Int. Cl. B44d 1/40; G02b 5/00
U.S. Cl. 117—61                   4 Claims

ABSTRACT OF THE DISCLOSURE

A plastic optical element is provided with a visually-undetectable and abrasion-resistant coating of an oxide of silicon by subjecting a clean surface of the element to glow-discharge oxygen-ion bombardment in vacuum and evaporating silicon monoxide in proximity to the element in the presence of oxygen at pressure such that the resulting coating and the plastic have the same index of refraction.

---

This invention relates to the coating art and is more particularly concerned with a novel method of coating thermoplastic articles and to the new products produced thereby. This invention is also concerned with a unique apparatus implementing this method.

In recent years a renewed interest has developed in optical parts made of thremoplastic material, particularly in view of the ease of casting these parts and the development of certain thermoplastic polymers having more desirable optical properties. Such optical parts promise a method of mass production of these parts and the resultant reduction in cost.

While such optical parts have been used in the past with a high degree of success, their use has been limited by the nature of the thermoplastic surface, which is very sensitive to abrasion.

It is an object of the present invention to provide a coating that may be applied to thermoplastic surfaces.

It is another object of the invention to provide a mar-resistant coating which may be applied to thermoplastic surfaces.

It is an additional object of the invention to provide a coating of controlled refractive index, so as to produce a thermoplastic element having the desired optical properties.

It is still another object of this invention to provide means by which the surface of a body can be coated with an oxide of silicon by the directional evaporation of a silicon monoxide pellet with minimal spattering of evaporant and decomposition of silicon monoxide and limited radiation heat transfer between the heat source and the substrate.

In summary, the invention relates to an optical element employing a thermoplastic base having a softening point of the order of 130° C. or higher, and a method and a means for coating this base with an oxide of silicon.

Those skilled in the art will gain a further and better understanding of this invention from the detailed description set forth below, taken in conjunction with the drawings accompanying and forming a part of this specification, in which:

FIG. 1 is a perspective and partly diagrammatic view of apparatus embodying this invention in a preferred form, parts being broken away for clarity; and FIG. 2 is a view similar to that of FIG. 1 of another preferred form of apparatus of this invention.

The present new method as employed in coating the thermoplastic comprises the following steps:

(1) the plastic article or substrate is cleaned with a detergent and water rinsed;

(2) it is placed in a vacuum system and pumped down to $1 \times 10^{-5}$ torr or better;

(3) oxygen is admitted to approximately 125 microns and a glow discharge is used to clean and prepare the substrate to receive an adherent protective film of silicon oxide;

(4) the system is again evacuated to a pressure of $3 \times 10^{-4}$ torr with the continuous admission of oxygen;

(5) the silicon monoxide is evaporated at about 1300° C. which coats the substrate with an adherent silicon oxide coating.

The types of plastic articles that may be coated by this method are thermoplastic materials having a softening point of 130° C. or above.

Polycarbonates are obtained by reacting phosgene with bis(monohydroxyarylene)alkanes, or with alkyl, cycloalkyl or other aryl dihydroxy compounds.

Goldberg Patent No. 3,169,121, assigned to the same assignee as the present invention, discloses and claims polycarbonates of the type herein referred to.

Materials of this type have a softening point of 130° C. to 365° C., depending on their composition and are usually water white transparent thermoplastic materials especially adapted to molding technique for the production of optical parts.

Polymethacrylate, generally known as "Acrylic Plastics" of a softening point of 130° C. or above may be used.

In order to clean the plastic substrate, a detergent wash with a water rinse may be used, but if the surface is clean and free from deposits, such as finger prints that would affect the coating, the washing step may be eliminated.

The cleaning step for the surfaces exposed to the glow discharge is performed in accordance with the technique disclosed in "Vacuum Depositions of Thin Films," by Holland, 1963, and includes an oxygen ion bombardment during the glow discharge.

The silicon monoxide evaporation procedure involves the use of the FIG. 1 apparatus to evaporate cylindrical pellets of silicon monoxide prepared in accordance with the disclosure in Patent No. 3,010,839. Alternatively, finely-divided silicon monoxide may be evaporated as it is fed continuously into the apparatus of FIG. 2. In either case, the operation is conducted under a controlled atmosphere, the oxygen pressure being between $10^{-5}$ and $10^{-3}$ mm. Hg so that the refractive index of the resulting coating may be controlled within the range of 1.4 to 2. This is not a step function relationship and therefore can readily be controlled continuously over this range.

Described generally, the apparatus of this invention comprises an open-ended cylinder of refractory metal foil from two to 10 mils thick. A charge engaging or positioning means is provided in the cylinder and supported by it to maintain the material to be heated and evaporated in place in the cylinder. A heating means is also provided for bringing the cylinder to a temperature at which evaporation of the charge will occur. Suitably, the cylinder is of tantalum, molybdenum or tungsten and the support means is of the same metal, whether it be in the form of a pin or grid or in the form of a baffle plate.

Further, the heating means may take the form of a high frequency coil or the cylinder and its charge may be resistance heated by connecting the cylinder in an electric circuit including a source of power. In its various forms and embodiments, this appartaus may be used for the evaporation of a wide variety of materials, but it has special utility in its FIGS. 1 and 2 forms for the production of silicon oxide coatings to make the present new articles by the method of this invention.

In carrying out this method and using the apparatus of FIG. 1, a silicon monoxide pellet 10 is placed in tantalum foil cylinder 12 formed with a pair of spaced apart, axially-extending flanges 13 and 14 separated by an electrically insulating filler block 15 which serves effectively to close slot or gap 16 extending the full axial length of cylinder 12. Tantalum contact strips 18 and 19 of generally L-shape in side elevation are tack welded to the outer surfaces of flanges 13 and 14, respectively, and serve as supporting members for cylinder 12. Strips 18 and 19 extend the full length of flanges 13 and 14 and project below the lower end of the cylinder, where leads 20 and 21 are connected to the strips so that current will flow through the cylinder to heat the cylinder and pellet 10. A diametrically-disposed support pin 24 has end portions projecting through openings provided in the cylinder to bear against the bottom of pellet 10 and hold it in place in the mid-section of cylinder 12.

Since the ends of cylinder 12 are open, vaporized material emerges from both ends of the cylinder and plastic articles 25 and 26 to be coated are disposed opposite the ends of the cylinder, as shown in FIG. 1. The evaporation rate is controlled, as indicated above, by regulating the input of electric power to the cylinder and charge and in this way the thickness of the silicon oxide coating on plastic articles 25 and 26 is controlled.

Where it is desired to use a particulate or powder form charge instead of a compact or pellet, the FIG. 2 apparatus has special utility. That equipment comprises a cylinder 30 of tantalum foil of substantially uniform thickness approximating five mils. Cylinder 30 is fitted with a baffle plate 32 of tantalum which has a tab hanger portion 33 with an upper rebent end portion disposed over the upper end of the cylinder. Plate 32 is disposed at an angle of about 45° to the axis of the cylinder so that charge powder particles 35 delivered by feeder 36 into cylinder 30 will be caused to bounce from the plate against the adjacent wall portion of the cylinder and to repeatedly bounce about as they are heated to their vaporization temperature. A high frequency coil 37 rated at 500 watts and 7 mc. is situated around and in close proximity to cylinder 30, as illustrated in FIG. 2, so that the heating effect is rapid and subject to close control.

Since unlike cylinder 12 of FIG. 1, cylinder 30 is fully open only at its upper end, the FIG. 2 apparatus is not capable of use in the simultaneous coating of objects such as plastic bodies 25 and 26. It has the advantage, however, that it stands self-supported on legs 40, 41 and 42 tack welded to the lower portions of cylinder 30. Also, the FIG. 2 apparatus does not require that the cylinder be coupled directly to an electric power source. Thus, it will be apparent that the different features of construction and operation of the apparatus of FIGS. 1 and 2 may be interchanged to provide the combination preferred by the user in which case, for example, the FIG. 2 device may be equipped with support pin 24 instead of baffle plate 32 where it is desired to use a pellet charge in an induction-heated assembly for coating two objects 25 and 26 simultaneously.

Whatever method and apparatus are used, the refractive index of the coating should match that of the plastic substrate, thus making the protective film practically optically undetectable.

As an example of the above process, using a polycarbonate substrate or article 25, the cleaning of the surface of the article was performed by exposing it to oxygen ion bombardment of glow discharge for about 5 minutes. Using the FIG. 1 apparatus, the silicon monoxide was evaporated at a temperature of 1300° C., at an oxygen partial pressure of $3 \times 10^4$ torr. The polycarbonate substrate surface 20 to 50 centimeters from the silicon monoxide source was monitored to be certain that the surface did not exceed 120° C. The rate of deposition was 5 angstrom units per second. This was continued until a film thickness of 1000 to 3000 angstrom units was obtained. The polycarbonate article was then removed from the deposition apparatus and it was observed that under the conditions of deposition a uniform transparent coating had been obtained which had an index of refraction of approximately 1.5 which exactly matched that of the substrate and was therefore invisible.

This substrate was tested for its mar-resistance in accordance with A.S.T.M. standard method for determining mar resistance of plastics No. D673–44, and the following results were obtained:

| Surface | Percent decrease in gloss |
|---|---|
| Unprotected polycarbonate | 50–60 |
| Polycarbonate with silicon oxide coating | 8–15 |
| Glass | 5–10 |

The surface is as nearly mar resistant as glass and the film is adherent due to the oxygen glow discharge step during the processing of the polycarbonate. The thickness of the silicon oxide coating can vary between 1000 A. units to 3000 A. units with a good mar resistance throughout this range. However, above 3000 A. units it has been found that the coating is not satisfactory, due to spalling of the film.

The exact nature of the film is not known, but it does consist of an oxide of silicon of higher oxygen content than a monoxide and it is not belived to be pure silicon dioxide. It is believed that this coating approaches the composition of disilicon trioxide.

A coating of this type permits the use of optical parts from thermoplastic transparent materials that have heretofore not been useable because they were easily marred. A striking example of this is in the production of eyeglasses of the non-breakable type, which can now be manufactured with the coating in a mar resistant form, where heretofore they were subject to abrasion during normal handling.

What I claim as new and desire to secure by Letters Patent of the United States is:

1. The method of applying on a plastic optical element a visually-undetectable and abrasion-resistant coating of an oxide of silicon which comprises the steps of cleaning the surface of the element and subjecting the element to glow-discharge oxygen-ion bombardment in the presence of oxygen at a pressure in the range of 0.01–0.3 micron, and depositing an oxide of silicon onto the resulting clean surface of said element by heating silicon monoxide in proximity to the plastic element while maintaining the plastic element below its softening temperature, the pressure of the oxygen being selected such that the index of refraction of the coating is equal to the index of refraction of the plastic element.

2. A plastic optical element having a visually-undetectable and an abrasion-resistant coating of an oxide of silicon, said coating having been applied by evaporating silicon monoxide in proximity to said element and in the presence of oxygen at a pressure in the range of 0.01–0.3 micron and thus depositing an oxide of silicon on said element to form a coating having the same index of refraction as the plastic of the element.

3. An optical element is described in claim 2 in which the thickness of the silicon oxide film on the element surface is in the range of 1000–3000 Angstrom units.

4. An optical element described in claim 2 in which the element is a transparent polycarbonate body having an index of refraction of 1.5, and in which the silicon oxide coating is from 1000–3000 Angstroms thick.

References Cited

UNITED STATES PATENTS

| | | | |
|---|---|---|---|
| 2,540,623 | 2/1951 | Law | 118—49.1 XR |
| 2,553,289 | 5/1951 | Alexander et al. | 117—106 XR |
| 2,641,954 | 6/1953 | Scharf et al. | 117—106 XR |
| 3,055,775 | 9/1962 | Crittenden et al. | |
| 3,356,523 | 12/1967 | Libbert. | |

OTHER REFERENCES

Holland, Vacuum Deposition of Thin Films, Wiley & Sons New York (1956) pp. 118–121, 449, 450, 483–489.

Weed, IBM Technical Disclosure Bulletin, vol. 2, No. 3 October 1959, pp. 27 and 28.

ALFRED L. LEAVITT, Primary Examiner

J. H. NEWSOME, Assistant Examiner

U.S. Cl. X.R.

117—93, 93.3, 106, 138.8; 118—49.5; 350—175